US012221983B1

(12) United States Patent
Mercogliano et al.

(10) Patent No.: US 12,221,983 B1
(45) Date of Patent: Feb. 11, 2025

(54) CENTRIFUGAL BLOWER WITH SOUND ABSORPTION STRUCTURE FOR AUTOMOTIVE HVAC SYSTEMS

(71) Applicant: DENSO THERMAL SYSTEMS S.p.A., Poirino (IT)

(72) Inventors: Francesco Mercogliano, Poirino (IT); Antonio Baiano Svizzero, Poirino (IT)

(73) Assignee: DENSO THERMAL SYSTEMS S.p.A., Poirino (IT)

( * ) Notice: Subject to any disclaimer, the term of this patent is extended or adjusted under 35 U.S.C. 154(b) by 0 days.

(21) Appl. No.: 18/587,022

(22) Filed: Feb. 26, 2024

(51) Int. Cl.
*F04D 29/66* (2006.01)
*F04D 29/42* (2006.01)

(52) U.S. Cl.
CPC ....... *F04D 29/665* (2013.01); *F04D 29/4226* (2013.01); *F05D 2260/96* (2013.01)

(58) Field of Classification Search
CPC ..................................................... F04D 29/665
See application file for complete search history.

(56) References Cited

U.S. PATENT DOCUMENTS 6,162,016 A * 12/2000 Humbad ............... F04D 29/422
415/212.1
10,473,120 B2 11/2019 Thawani et al.
2021/0095679 A1 4/2021 Uchino et al.

FOREIGN PATENT DOCUMENTS

CN 117404314 A * 1/2024
IT 201900006861 A1 11/2020

OTHER PUBLICATIONS

Google Patent Translation of CN117404314A (Year: 2024).*

* cited by examiner

*Primary Examiner* — Courtney D Heinle
*Assistant Examiner* — Danielle M. Christensen
(74) *Attorney, Agent, or Firm* — CANTOR COLBURN LLP

(57) ABSTRACT

A housing of plastics material for a centrifugal blower for automotive HVAC systems is provided. The housing has a base half shell and a cover half shell joined to each other, and a sound absorption structure having a chamber side panel fitted into a seat formed in the base half shell and facing an impeller chamber, and an outlet side panel fitted into a seat formed in the cover half shell and facing an air outlet duct.

11 Claims, 8 Drawing Sheets

FIG.3
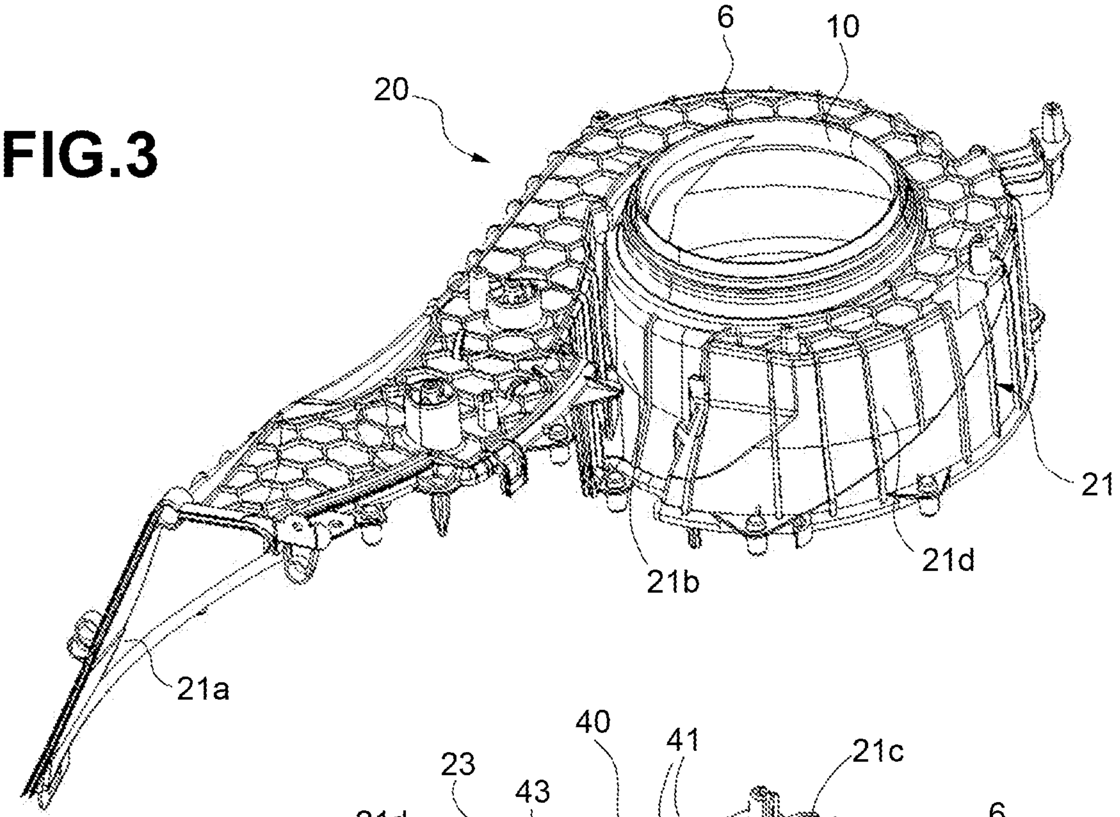
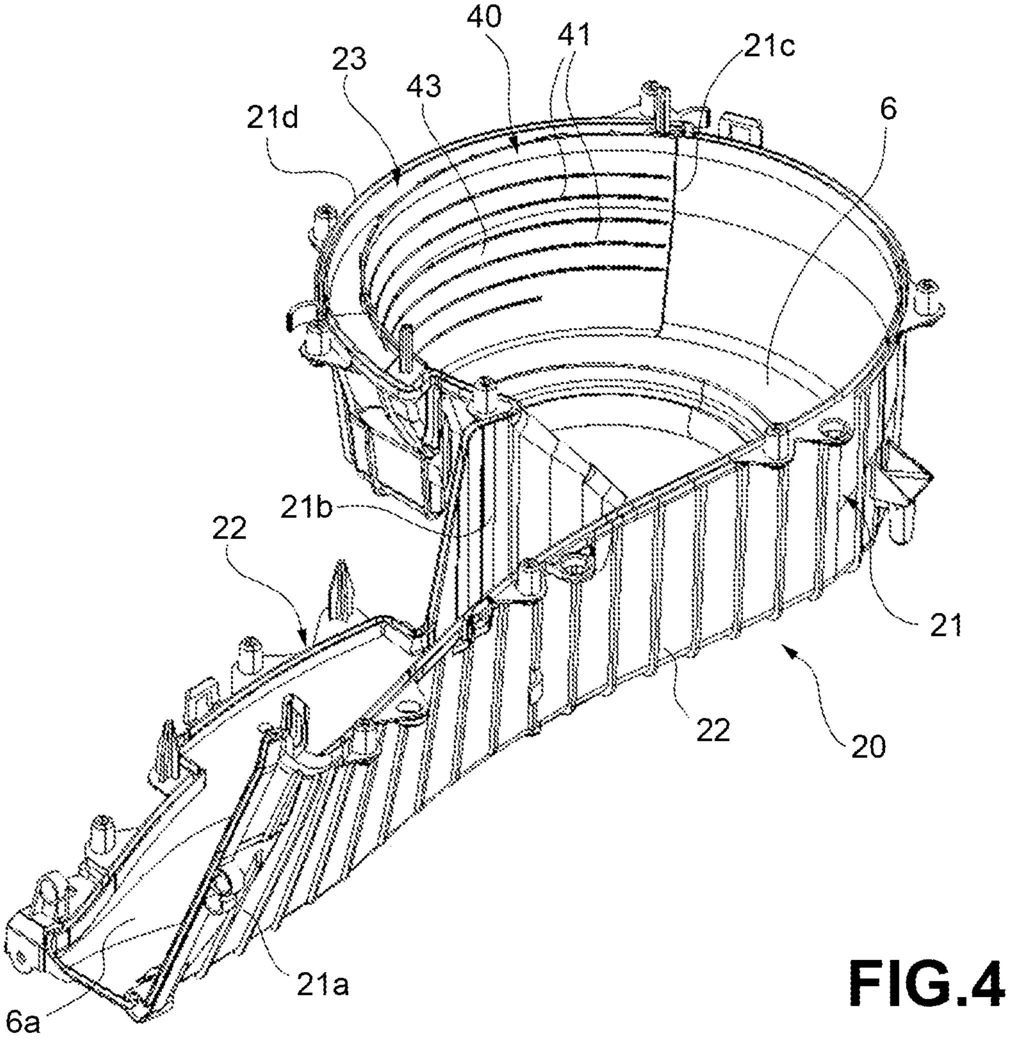
FIG.4

CENTRIFUGAL BLOWER WITH SOUND ABSORPTION STRUCTURE FOR AUTOMOTIVE HVAC SYSTEMS

FIELD OF THE INVENTION

The present invention relates to a housing of plastics material for a centrifugal blower for automotive HVAC systems, having a base end wall, a cover end wall and a side wall extending between the base end wall and the cover end wall, in the housing there being defined an impeller chamber and an air outlet duct, wherein on the cover end wall there is formed an air inlet opening facing the impeller chamber, and on the side wall there is formed an air outlet opening facing the air outlet duct, wherein a sound absorption structure is arranged on the side wall, the sound absorption structure comprising at least one resonant cavity fluidically connected to the impeller chamber and the air outlet duct through a plurality of slits arranged on the side wall and facing at least one of the impeller chamber and air outlet duct.

BACKGROUND OF THE INVENTION

In centrifugal blowers, the air drawn into the blower by rotation of the impeller enters the inlet opening formed in one of the end walls of the housing of the blower with a direction parallel to the axis of rotation of the impeller and is subsequently expelled through the outlet opening formed in the side wall of the housing with a direction perpendicular to the inlet direction.

The use of a sound absorption structure makes it possible to reduce the noise generated by the air inside the housing of the blower. The resonant cavity/cavities and the communication openings thereof with the impeller chamber and air outlet duct are sized to create a Helmholtz resonance with the air being pushed by the impeller acting as a dynamic damper for sound waves. To increase the sound absorption effect, it may be envisaged for the resonant cavity to be at least partially filled with a porous sound absorption material.

An embodiment of a housing equipped with a sound absorption structure is described at the general concept level in the Applicant's Italian Patent Application No. 102019000006861.

SUMMARY OF THE INVENTION

One object of the present invention is to provide a solution to make the concept described in Italian Patent Application No. 102019000006861 producible on an industrial scale.

For this object, the subject matter of the invention is a housing for centrifugal blowers of the type defined above, comprising:

- a base half shell formed by the base end wall and by a first portion of the side wall, protruding from the base end wall, said first portion of the side wall surrounding the impeller chamber and delimiting on a radially outer side the air outlet duct,
- a cover half shell formed by the cover end wall and by a second portion of the side wall, protruding from the cover end wall, said second portion of the side wall delimiting on a radially inner side the air outlet duct, and
- at least one of:
  - a chamber side panel fitted into a seat formed in the base half shell and facing the impeller chamber, wherein the at least one resonant cavity is formed between the chamber side panel and the first portion of the side wall, and wherein the slits are formed on the chamber side panel, and
  - an outlet side panel fitted into a seat formed in the cover half shell and facing the air outlet duct, wherein the at least one resonant cavity is formed between the outlet side panel and the second portion of the side wall, and wherein the slits are formed on the outlet side panel,
- wherein the base half shell and the cover half shell are joined to each other.

The housing according to the present invention may be made from three, or at most four, pieces of plastics material which are assembled together, and have relatively simple shapes and are thus easily made through conventional injection molding techniques. It therefore lends itself to economic implementation on an industrial scale.

Preferred embodiments of the present invention are also described.

BRIEF DESCRIPTION OF THE FIGURES

Further features and advantages of the housing according to the present invention will become clearer from the following detailed description of an embodiment of the invention, made in reference to the accompanying drawings, provided purely for illustrative and non-limiting purposes, wherein:

FIGS. 3 and 4 are perspective views of the base half shell from the outer and inner sides of the shell, respectively;

DETAILED DESCRIPTION

Figure 1:
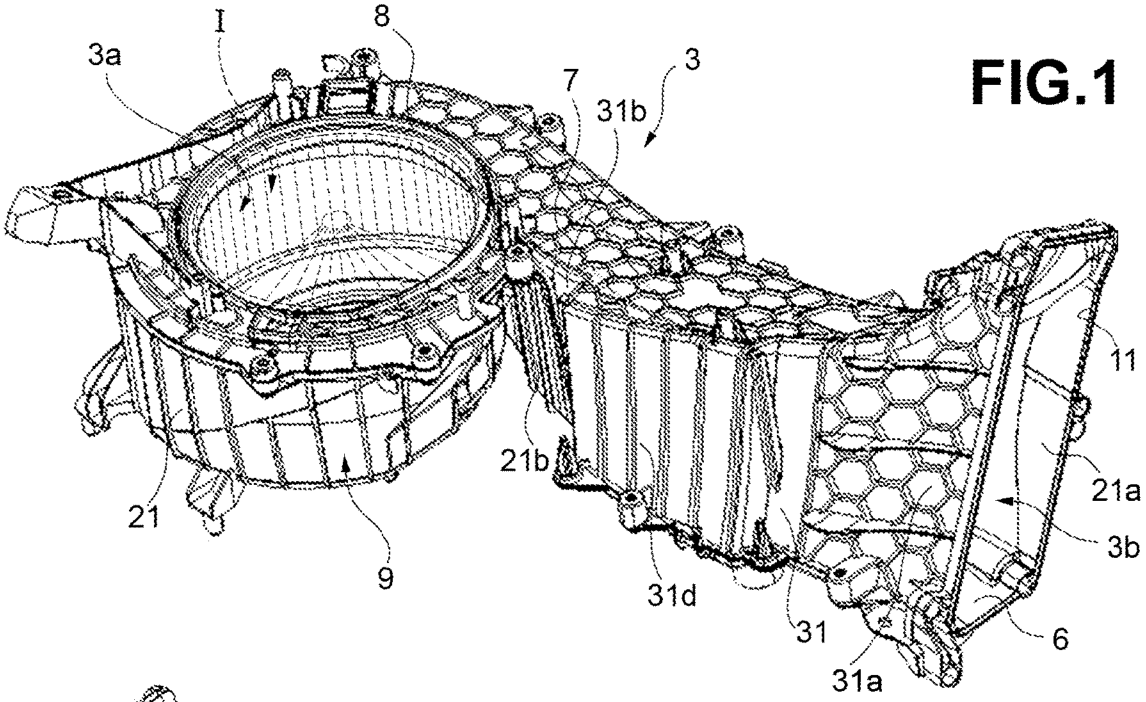
FIG. 1 is a perspective view of a housing for a centrifugal blower according to the present invention.
Figure 2:
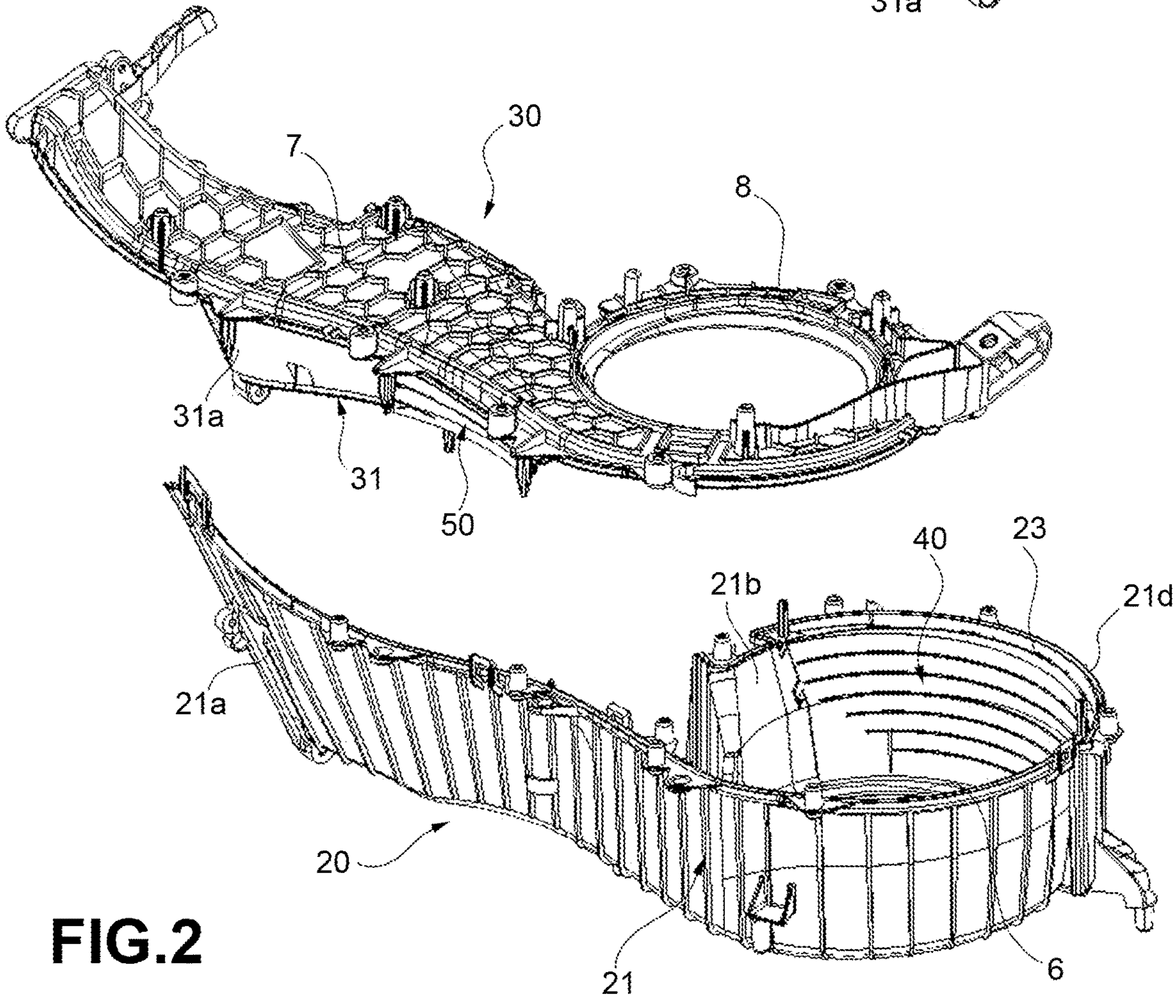
FIG. 2 is an exploded view, showing the housing split into a base half shell and a cover half shell.

FIG. 1 shows a housing or volute made of plastics material for a centrifugal blower, denoted as a whole with 3.

The housing 3 is configured to accommodate an impeller I of the centrifugal blower, lightly depicted with dashed lines in FIG. 1. The housing 3 is also configured to be coupled to an electric motor (not shown) to drive the impeller I, the electric motor being arranged outside of the housing 3.

From the point of view of its overall shape/geometry, the housing or volute 3 comprises a pair of end walls 6 and 7, hereinafter referred to as "base end wall" and "cover end wall", respectively, and a side wall 9 extending between the end walls 6, 7. An air inlet opening 8 is formed on the cover end wall 7, and a passage opening 10 is formed on the base end wall 6, through which opening the shaft (not shown) passes, connecting the electric motor to the impeller I of the blower. An air outlet opening 11 is formed on the side wall 9 of the housing 3.

The end walls 6, 7 and the side wall 9 of the housing 3 cooperate to define an impeller chamber 3*a*, within which the impeller I is housed, and an air outlet duct 3*b*, which connects the impeller chamber 3*a* to the air outlet opening 11 and is configured to convey the air flow pushed in a centrifugal direction from the impeller I to the air outlet opening 11.

A sound absorption structure is arranged on the side wall 9, which will be described hereinafter.

In terms of its construction, the housing 3 comprises four pieces of plastics material assembled together. More specifically, the housing 3 comprises a base half shell 20, a cover half shell 30, a chamber side panel 40, and an outlet side panel 50.

The base half shell 20 is shown separately in FIGS. 2-4 and 6-9. The base half shell 20 is essentially formed by the base end wall 6 and by a first portion 21 of the side wall 9, which protrudes from the base end wall 6. The first portion 21 of the side wall 9, which will also be referred to as the first wall portion 21 hereinafter, extends along part of the perimeter of the base end wall 6. More specifically, the first portion 21 extends so as to surround the impeller chamber 3*a* and delimit on a radially outer side the air outlet duct 3*b*. In this description, the radial positions are defined with respect to the central axis x of the impeller chamber 3*a* (shown in FIG. 6; the central axis x here defined corresponds to the position of the axis of rotation of the impeller I). Therefore, the radially outer side of the outlet duct 3*b* is the side of the outlet duct 3*b* furthest from the central axis x.

In particular, the first portion 21 of the side wall 9 extends between an end area 21*a* thereof at the air outlet opening 11 and a rostrum-shaped end area 21*b* thereof at the junction of the impeller chamber 3*a* and the radially inner side of the air outlet duct 3*b*.

The base half shell 20 therefore comprises a peripheral edge 22 that partly extends along the entire first portion 21 of the side wall 9 and partly extends along the radially inner side of a portion 6*a* of the base end wall 6 that delimits the air outlet duct 3*b*.

The cover half shell 30 is shown separately in FIGS. 2, 11-12 and 15. The cover half shell 30 is essentially formed by the cover end wall 7 and by a second portion 31 of the side wall 9 that protrudes from the cover end wall 7. The second portion 31 of the side wall 9, which will also be referred to as the second wall portion 31 hereinafter, extends along part of the perimeter of the cover end wall 7. More specifically, the second portion 31 extends so as to delimit on a radially inner side the air outlet duct 3*b*.

In particular, the second portion 31 of the side wall 9 extends between an end area 31*a* thereof at the air outlet opening 11 and an end area 31*b* thereof adjacent to the junction between the impeller chamber 3*a* and the radially inner side of the air outlet duct 3*b*.

The cover half shell 30 therefore comprises a peripheral edge 32 that extends partly along the perimeter of the cover end wall 7 and partly along the second portion 31 of the side wall 9.

The base half shell 20 and the cover half shell 30 are joined to each other. More specifically, the peripheral edge 22 of the base half shell 20 and the peripheral edge 32 of the cover half shell 30 are joined to each other in a relationship of abutment against each other in a manner known per se in the industry, such as by screws or snap fasteners arranged along the peripheral edges, or by adhesives or welding.

Figure 10:
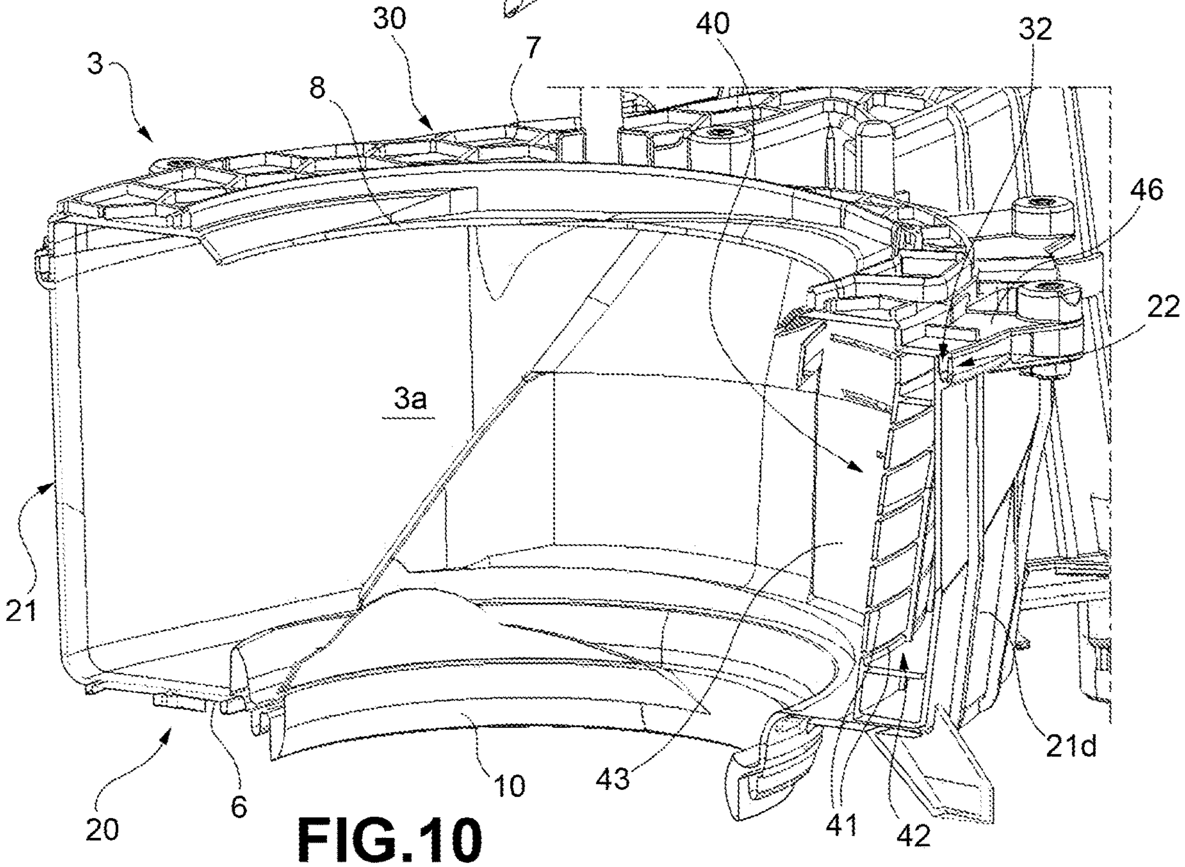
FIG. 10 is a sectional view of the complete housing, taken at the impeller chamber.
Figure 11:
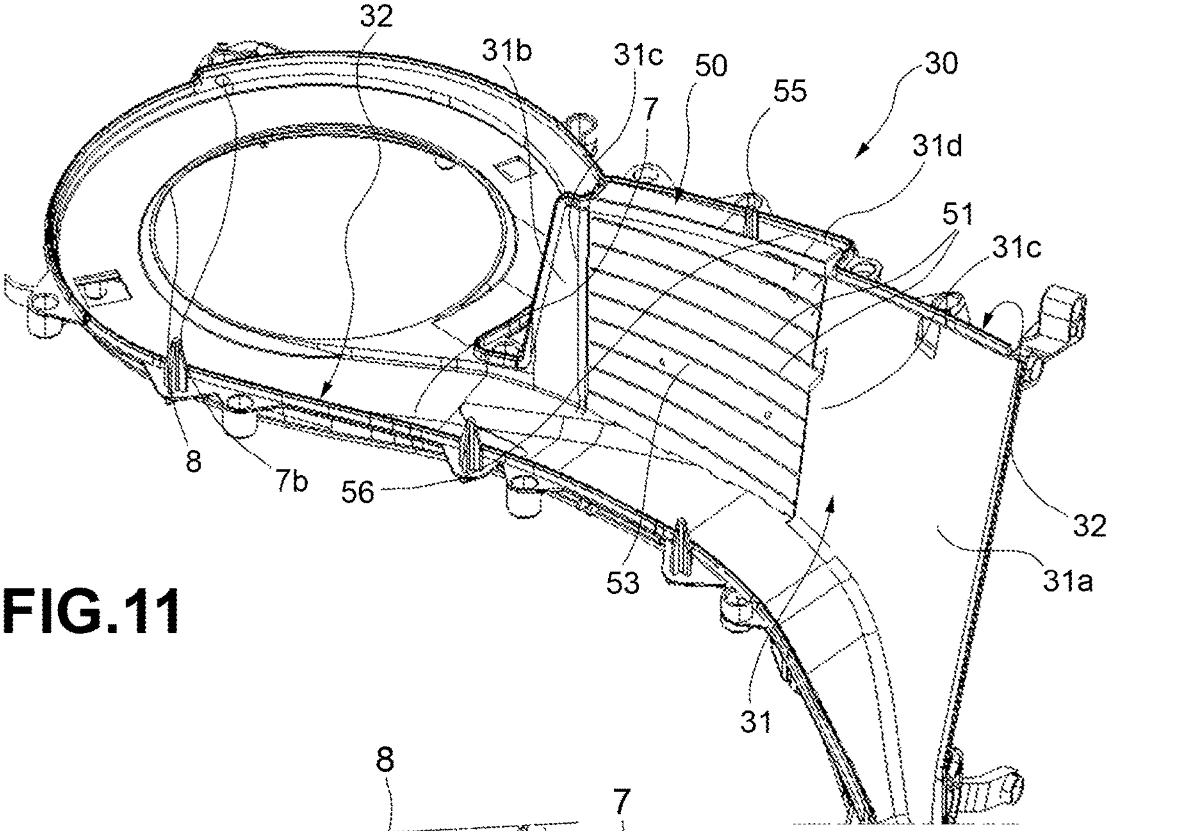
FIG. 11 is a perspective view of the cover half shell, taken from the inner side of the housing.
Figure 16:
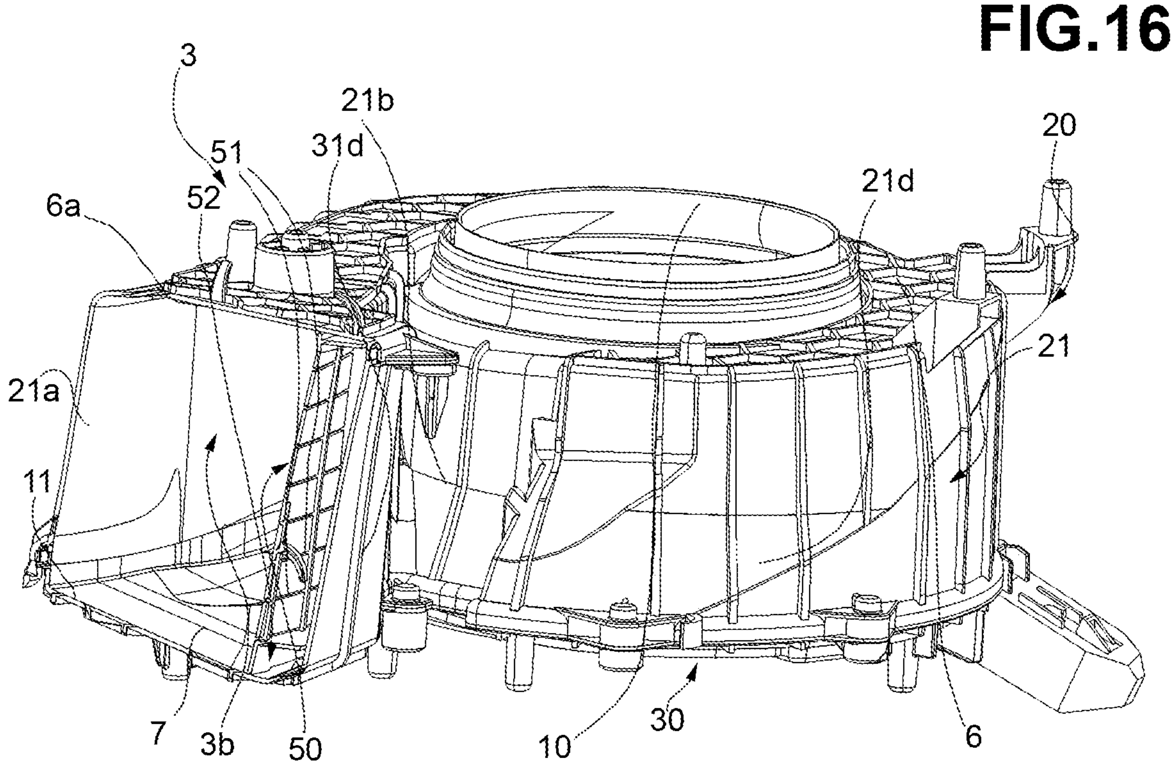
FIG. 16 is a sectional view of the complete housing, taken at the air outlet duct.

When the base half shell 20 and the cover half shell 30 are joined to each other to make the housing 3, the side wall 9 of the housing 3 is formed by the union between the first portion 21 and the second portion 31. In particular, near the junction between the impeller chamber 3*a* and the radially inner side of the air outlet duct 3*b* there is a coupling between an edge of the end area 21*b* of the first wall portion 21 and the end area 31*b* of the second wall portion 31. In the assembled housing 3, the impeller chamber 3*a* is enclosed between the base end wall 6 and the first wall portion 21 of the base half shell 20 on one side, and the cover end wall 7 of the cover half shell 30 on the other side, as may be seen in FIG. 10. In contrast, the air outlet duct 3*b*, for most of its length, and the air outlet opening 11 are enclosed between the base end wall 6 and the first wall portion 21 (radially outer side of the duct) of the base half shell 20 on one side, and the cover end wall 7 and the wall portion 31 (radially inner side of the duct) of the cover half shell 30 on the other side, as may be seen in FIGS. 1 and 16. At the junction between the impeller chamber 3*a* and the air outlet duct 3*b*, the air outlet duct 3*b* is initially enclosed between the base end wall 6 (radially outer side and radially inner side of the duct) and the first wall portion 21 of the base half shell 20 on one side, and the cover end wall 7. Moving toward the air outlet opening 11, the height of the first wall portion 21 of the base half shell 20 on the radially inner side of the duct decreases, giving way to the second wall portion 31 of the cover half shell 30, the height of which increases accordingly. However, this transition is limited in a short segment of the air outlet duct 3*b* near the junction with the impeller chamber 3*a*.

The sound absorption structure of the blower is obtained by the chamber side panel 40 and the outlet side panel 50.

The chamber side panel 40 is shown in FIGS. 2, 4-5 and 7-10. The chamber side panel 40 is fitted into a seat 23 formed in the base half shell 20, whereby it faces the impeller chamber 3*a* at a given distance from the first wall portion 21. This creates at least one resonant cavity 42 between the chamber side panel 40 and the first wall portion 21, which resonant cavity is fluidically connected to the impeller chamber 3*a*. The fluidic connection is made through a plurality of slits 41 formed on (or rather, through) the chamber side panel 40. In the illustrated example, the slits 41 are formed as an array of parallel slits extending approximately along the main direction of the airflow in the impeller chamber 3*a*. However, the shape and arrangement of the slits may be designed differently from those depicted in the figures, depending on the conditions under which the blower is expected to operate.

A porous sound absorption material (not shown) may be placed inside the resonant cavity 42.

Figure 5:
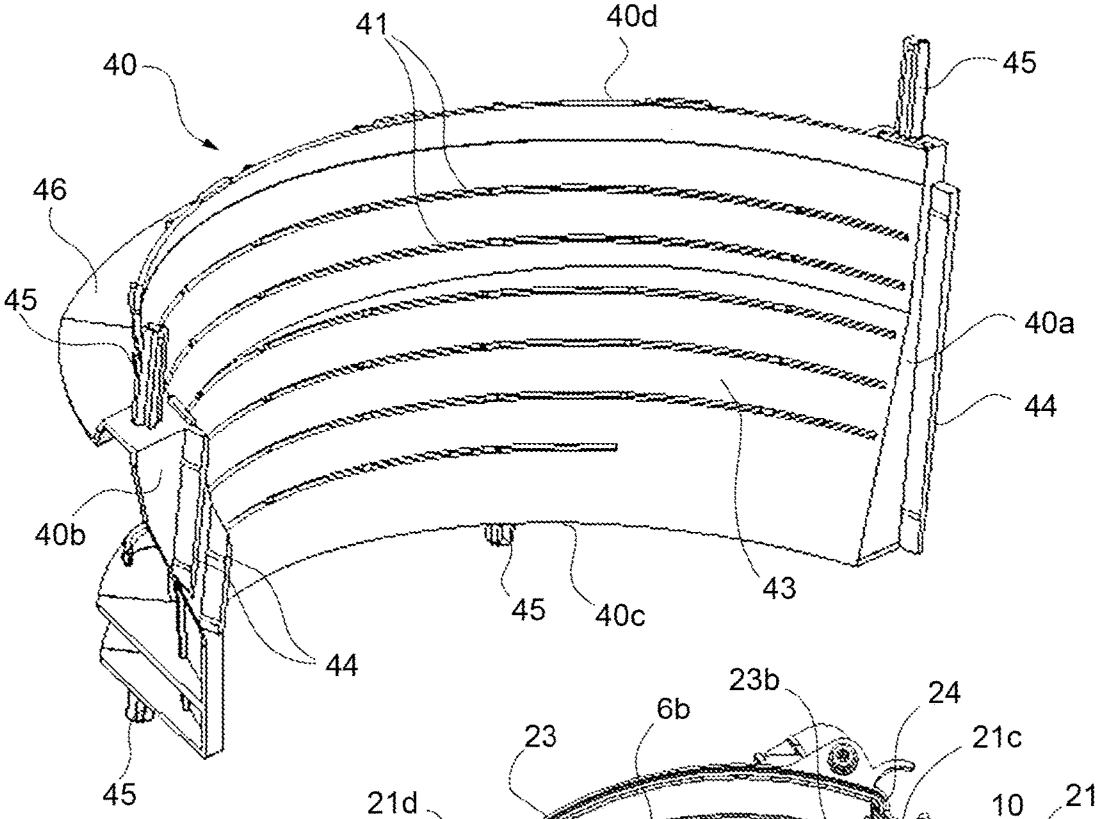
FIG. 5 is a view of a chamber side panel configured to be fitted into the base half shell.

The chamber side panel 40 is arch-shaped (see in particular FIG. 5). The seat 23 that receives the chamber side panel 40 is formed as a recess in the first wall portion 21, facing the impeller chamber 3*a* (see in particular FIG. 6). When fitted into the relative seat 23, the chamber side panel 40 comprises a surface 43 facing the impeller chamber 3*a* that is flush with a surface 21*c*, facing the impeller chamber 3*a*, of an area of the first wall portion 21 adjacent to the seat 23.

The chamber side panel 40 and the relative seat 23 have an angular extension a, with respect to the central axis x of the impeller chamber 3*a*, of less than 180°. The chamber side panel 40 and the seat 23 extend along a segment of the perimeter of the impeller chamber 3*a* from the end area 21*b* of the first portion of the wall at the junction between the impeller chamber 3*a* and the radially inner side of the air outlet duct 3*b*. This arrangement makes it possible to limit the sound absorption structure where the effects of the turbulence created by the airflow in the impeller chamber are most significant.

Figure 6:
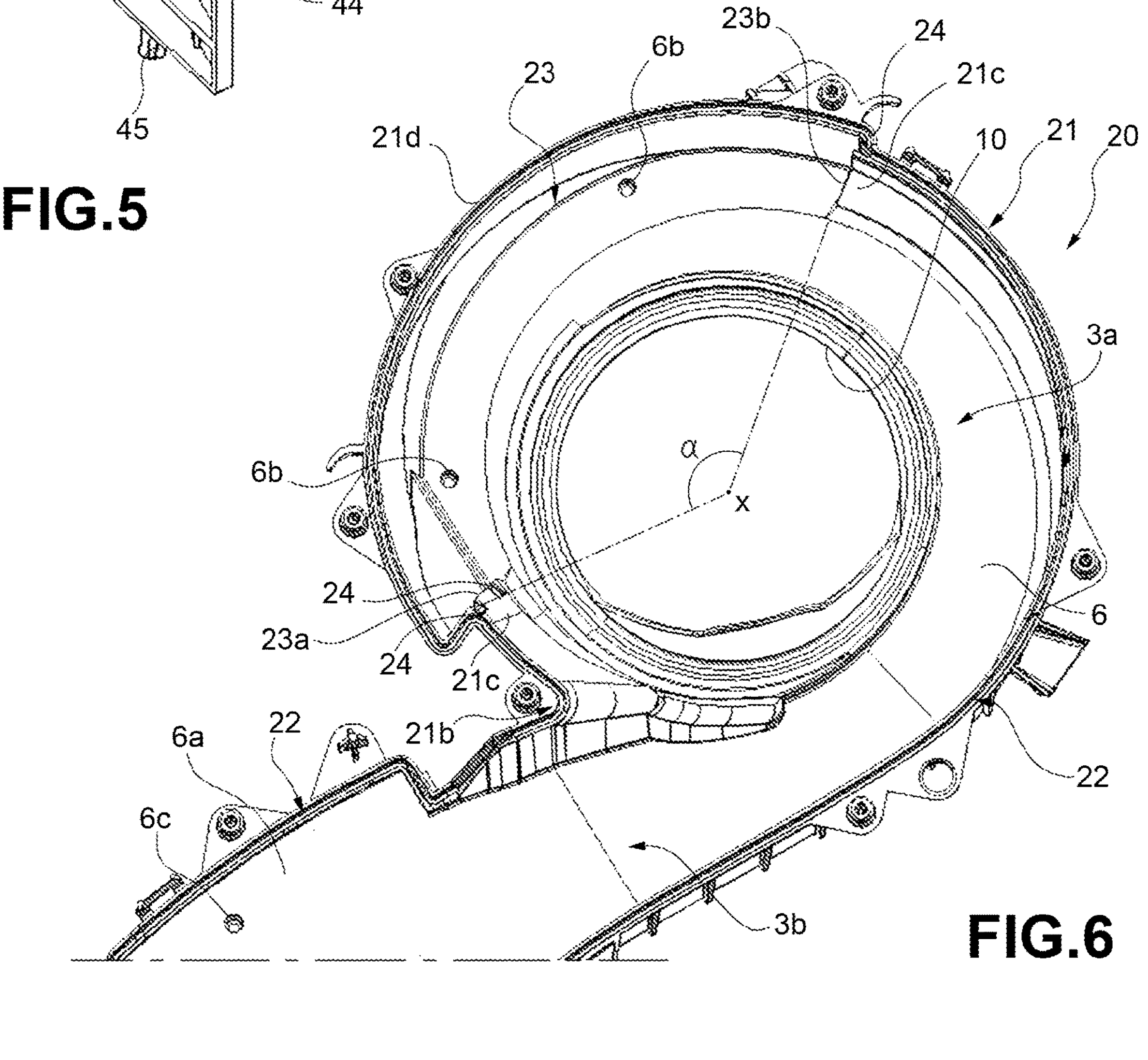
FIG. 6 is a perspective view of the base half shell from which the chamber side panel has been removed.
Figure 7:
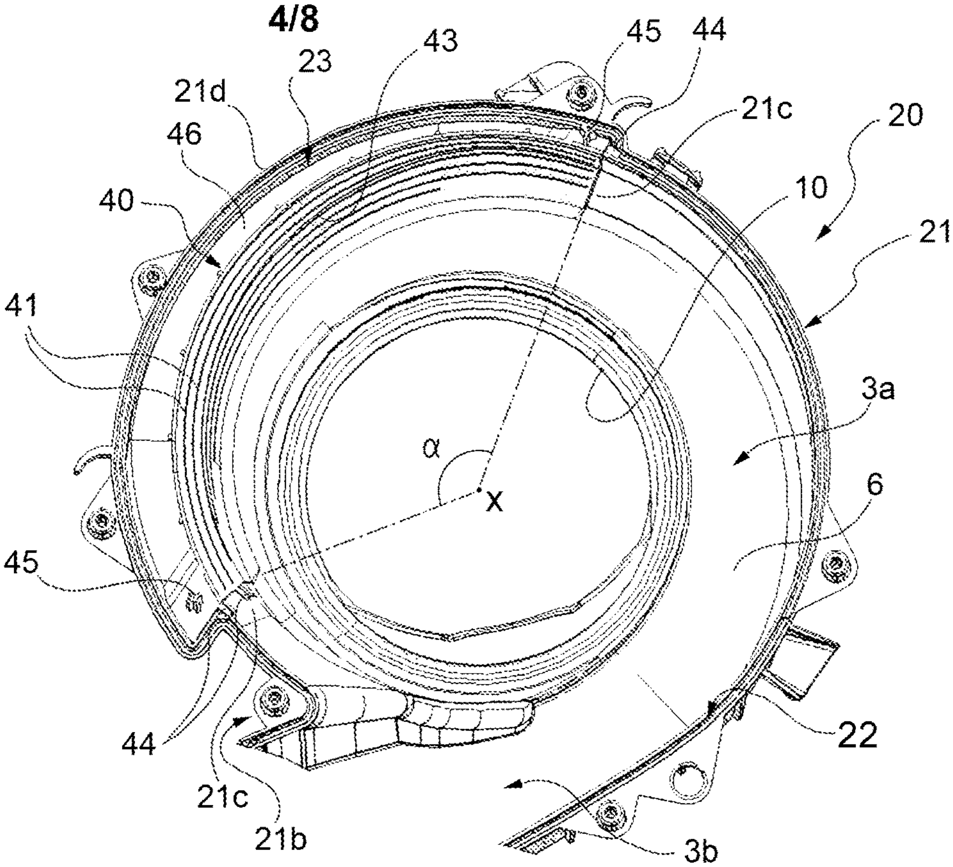
FIGS. 7 and 8 are further perspective views of the base half shell.
Figure 8:
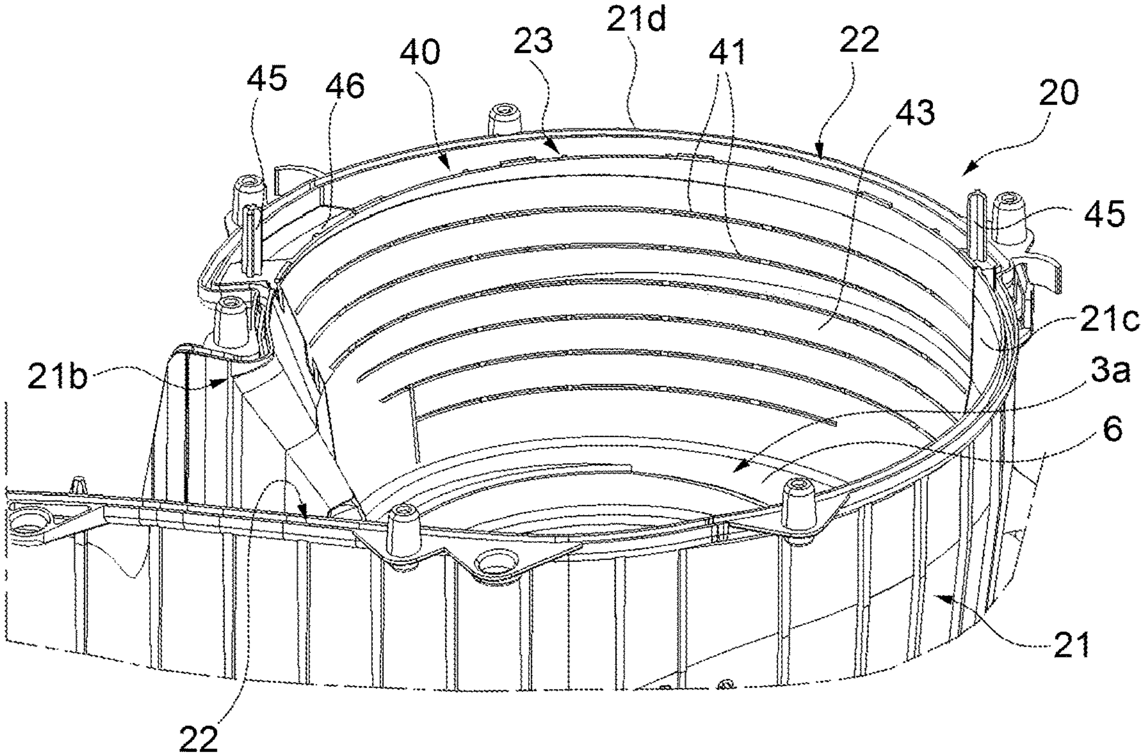
Figure 9:
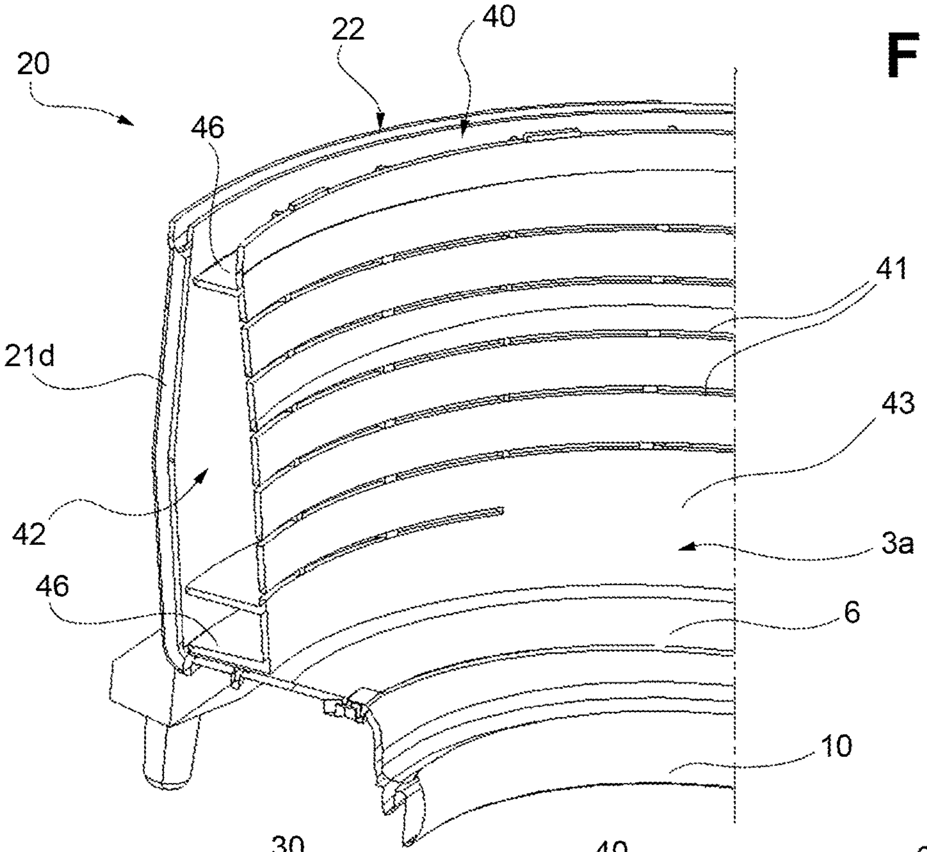
FIG. 9 is a sectional view of a detail of the base half shell, taken at the impeller chamber.

As may be seen in FIGS. 5-7, the chamber side panel 40 comprises side ends 40*a*, 40*b* coupled to respective side ends 23*a*, 23*b* of the relative seat 23. In particular, the insertion of the chamber side panel 40 into the seat 23 is done through ribs 44 fitted onto the side ends 40*a*, 40*b* of the chamber side panel 40, which are fitted into respective guide grooves 24 formed in the ends 23*a*, 23*b* of the seat (the arrangement of ribs and grooves may be reversed from that described above, if necessary). Thus, the insertion of the chamber side panel 40 occurs substantially in the direction of the height of the first wall portion 21.

The chamber side panel 40 further comprises terminal ends 40*c*, 40*d* coupled to the base end wall 6 and to the cover end wall 7, respectively. This coupling is achieved by alignment pins 45 fitted onto the terminal ends 40*c*, 40*d* of the chamber side panel 40, which are fitted into respective holes 6*b*, 7*b* formed in the base end wall 6 and in the cover end wall 7 (the arrangement of pins and holes may be reversed from that described above, if necessary).

The chamber side panel 40 comprises rearwardly at least one ledge protrusion 46 that extends within the seat 23 up to the lowered part 21*d* of the first wall portion 21 surrounding the seat 23. This achieves a complete closure of the seat 23 by the chamber side panel 40.

The outlet side panel 50 is shown in FIGS. 2, and 11-16. The outlet side panel 50 is fitted into a seat 33 formed in the cover half shell 30 so that it faces the air outlet duct 3*b*, at a given distance from the second wall portion 31. This creates at least one resonant cavity 52 between the outlet side panel 50 and the second wall portion 31, which resonant cavity is fluidically connected to the air outlet duct 3*b*. This fluidic connection is made by a plurality of slits 51 formed on (or rather, through) the outlet side panel 50. In the illustrated example, the slits 51 are formed as an array of parallel slits extending approximately along the main direction of the airflow in the air outlet duct 3*b*. However, the shape and arrangement of the slits may be designed differently from those shown in the figures, according to the conditions under which the blower is expected to operate.

A porous sound absorption material (not shown) may be placed inside the resonant cavity 52.

Figure 12:
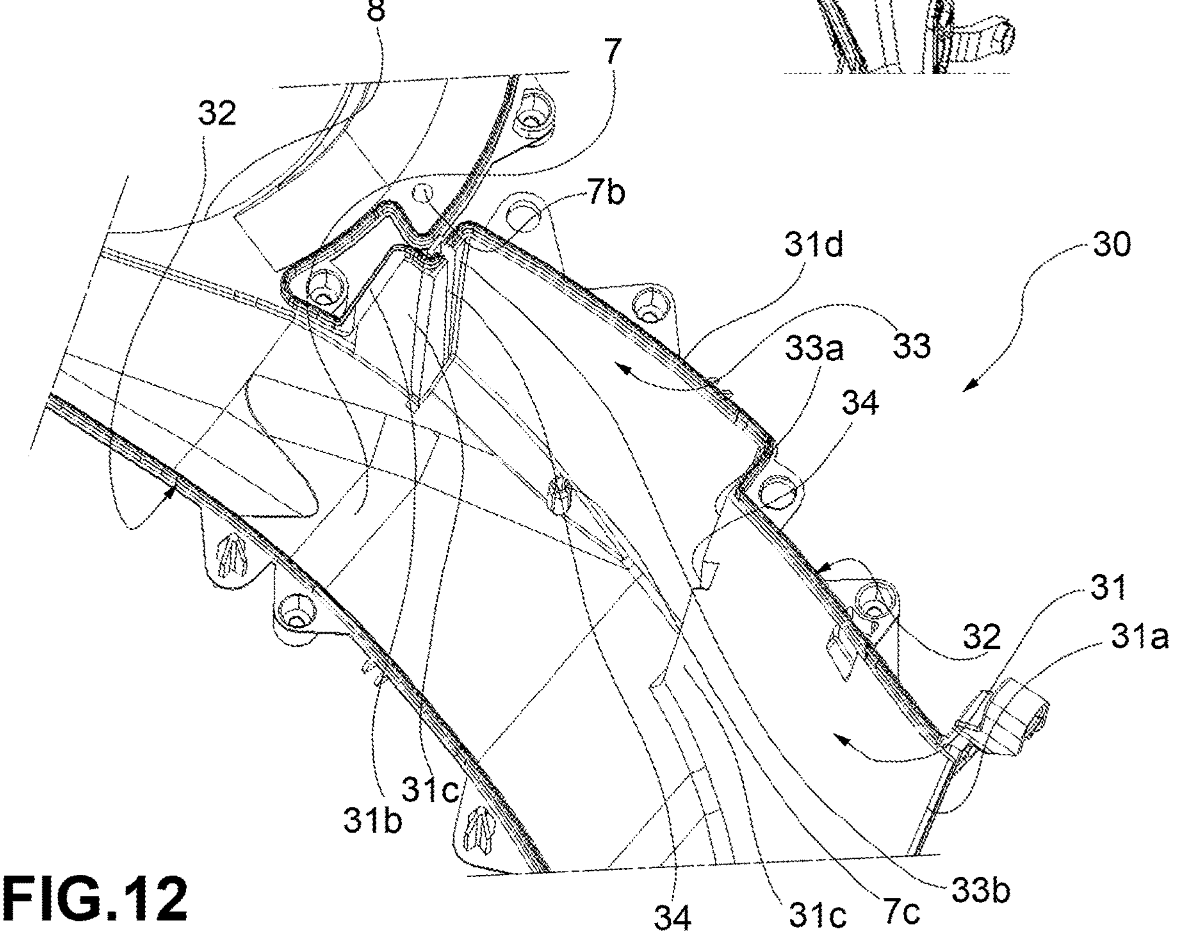
FIG. 12 is a perspective view of the cover half shell, from which an outlet side panel has been removed.

The seat 33 that receives the outlet side panel 50 is formed as a recess in the second wall portion 31, facing the air outlet duct 3*b* (see in particular FIG. 12). When fitted into the relative seat 33, the outlet side panel 50 comprises a surface 53 facing the air outlet duct 3*b* that is flush with a surface 31*c*, facing the air outlet duct 3*b*, of an area of the second wall portion 31 adjacent to the seat 33.

The outlet side panel 50 and the seat 33 extend for a partial segment of the length of the air outlet duct 3*b* from the end area 31*b* of the second wall portion 31 adjacent to the junction between the impeller chamber 3*a* and the radially inner side of the air outlet duct 3*b*. This arrangement makes it possible to limit the sound absorption structure where the effects of the turbulence created by the airflow in the impeller chamber are most significant.

Figure 13:
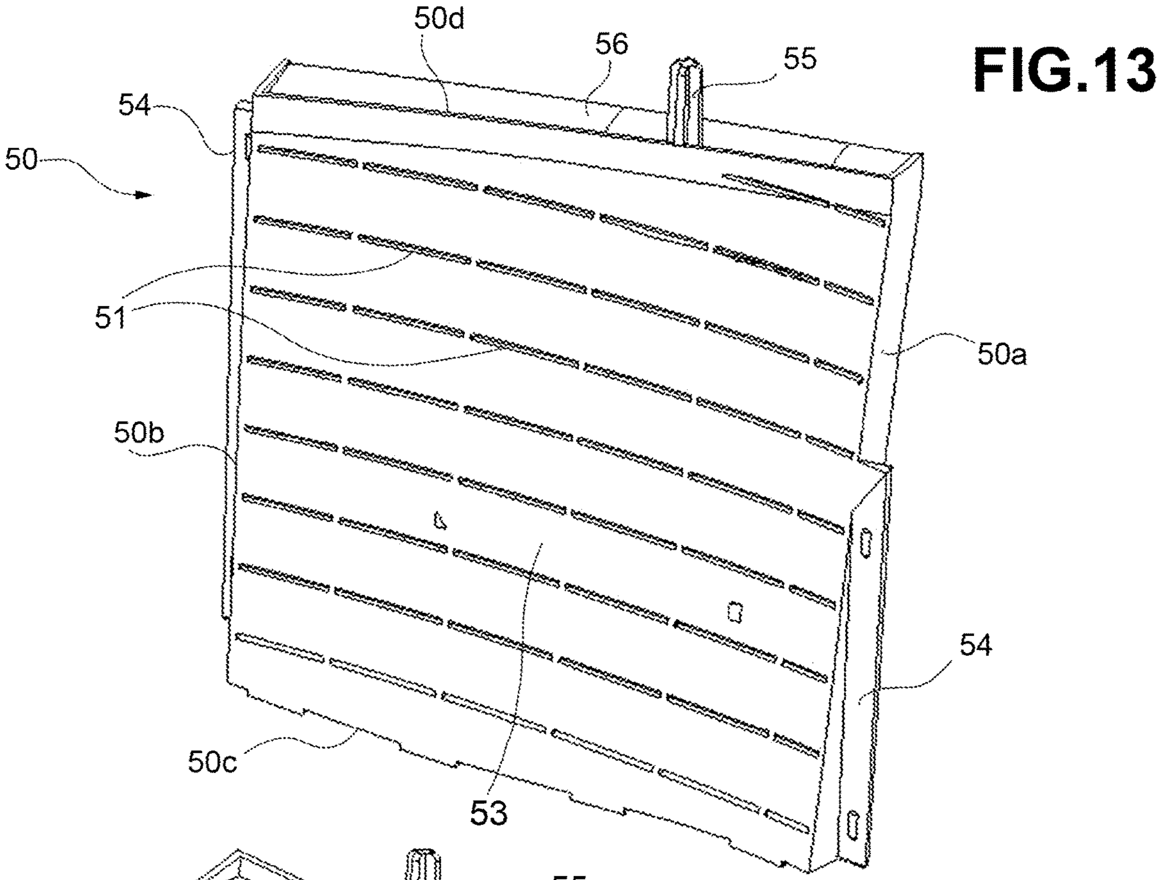
FIGS. 13 and 14 are perspective views of the outlet side panel from the side facing the air outlet duct and from the rear side, respectively.
Figure 14:
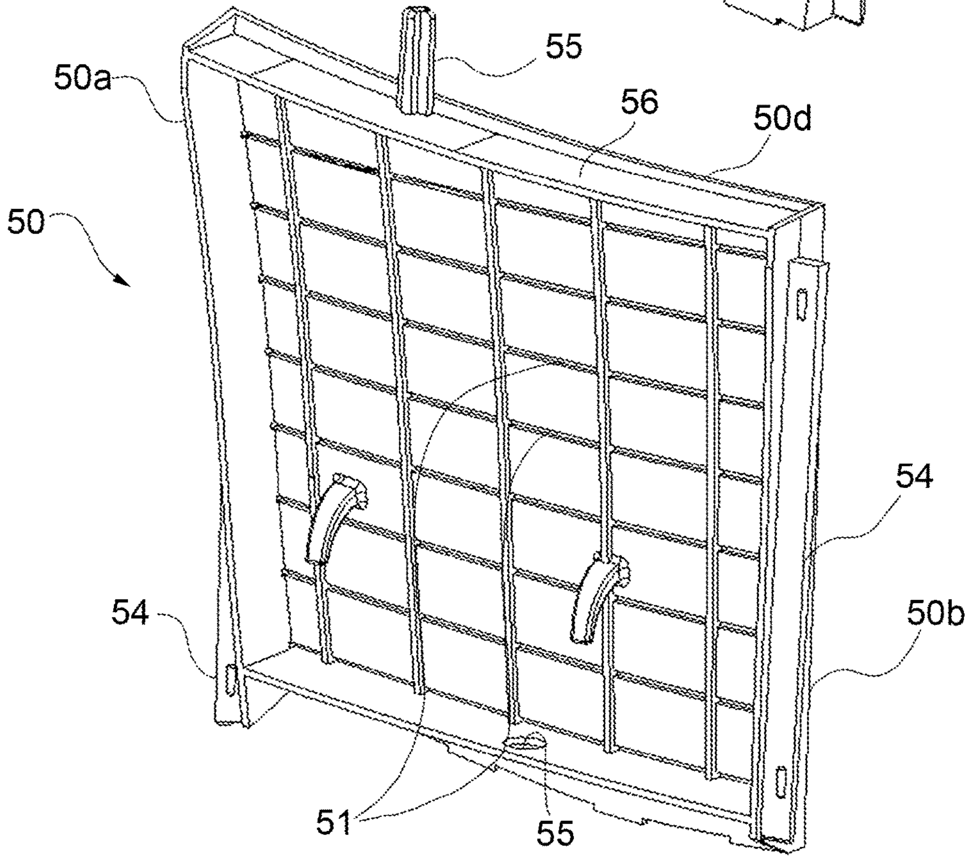
Figure 15:
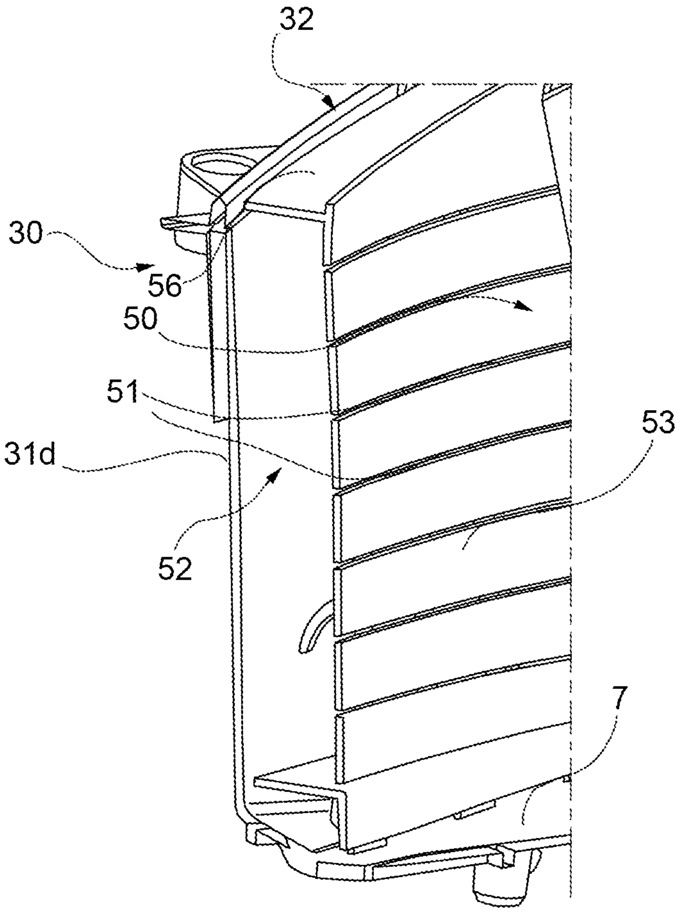
FIG. 15 is a sectional view of a detail of the cover half shell, taken at the air outlet duct.

As may be seen in FIGS. 12-14, the outlet side panel 50 comprises side ends 50*a*, 50*b* coupled to respective side ends 33*a*, 33*b* of the relative seat 33. In particular, the insertion of the outlet side panel 50 into the seat 33 is done through ribs 54 fitted onto the side ends 50*a*, 50*b* of the outlet side panel 50, which are fitted into respective guide grooves 34 formed in the ends 33*a*, 33*b* of the seat (the arrangement of ribs and grooves may be different from that described above, e.g., reversed therefrom). Thus, the insertion of the outlet side panel 50 occurs substantially in the direction of the height of the second wall portion 31.

The outlet side panel 50 further comprises terminal ends 50*c*, 50*d* coupled to the cover end wall 7 and to the base end wall 6, respectively. This coupling is done by alignment holes/pins 55 formed on the terminal ends 50*c*, 50*d* of the outlet side panel 50, which are coupled to respective alignment pins/holes 7*c*, 6*c* formed in the cover end wall 7 and in the base end wall 6 (the arrangement of pins and holes may be different from that described above, e.g. reversed therefrom).

The outlet side panel 50 comprises rearwardly at least one ledge projection 56 that extends within the seat 33 to the lowered part 31*d* of the first wall portion 31 surrounding the seat 33. In this way, a complete closure of the seat 33 by the outlet side panel 50 is obtained.

According to alternative embodiments that are not shown, the sound absorption structure may be provided only in the impeller chamber 3*a* or only in the air outlet duct 3*b*. In which case, only the chamber side panel 40 or, respectively, the outlet side panel 50 will be provided.

What is claimed is:

1. A housing of plastics material for a centrifugal blower for automotive HVAC systems, comprising a base end wall, a cover end wall and a side wall extending between the base end wall and the cover end wall, in said housing there being defined an impeller chamber and an air outlet duct, wherein on the cover end wall there is formed an air inlet opening facing the impeller chamber, and on the side wall there is formed an air outlet opening facing the air outlet duct, wherein a sound absorption structure is arranged on said side wall, said sound absorption structure comprising at least one resonant cavity fluidically connected to the impeller chamber and the air outlet duct through a plurality of slits arranged on the side wall and facing at least one of said impeller chamber and air outlet duct, the housing further comprising a base half shell formed by the base end wall and by a first portion of the side wall, protruding from the base end wall, said first portion of the side wall surrounding the impeller chamber and delimiting on a radially outer side the air outlet duct, a cover half shell formed by the cover end wall and by a second portion of the side wall, protruding from the cover end wall, said second portion of the side wall delimiting on a radially inner side the air outlet duct, and at least one of:

a chamber side panel fitted in a seat formed in the base half shell and facing said impeller chamber, wherein said at least one resonant cavity is formed between the chamber side panel and said first portion of the side wall, and wherein said slits are formed on the chamber side panel, and an outlet side panel fitted in a seat formed in the cover half shell and facing said air outlet duct, wherein said at least one resonant cavity is formed between the outlet side panel and said second portion of the side wall, and wherein said slits are formed on the outlet side panel, wherein the base half shell and the cover half shell are joined to each other, and wherein the chamber side panel is arch-shaped, and the seat in which the chamber side panel is fitted is formed as a recess in the first portion of the side wall, facing the impeller chamber, and wherein the chamber side panel comprises a surface facing the impeller chamber that is flush with a surface, facing the impeller chamber, of an area of the first portion of the side wall adjacent to the seat.

2. The housing of claim 1, wherein the base half shell comprises a peripheral edge extending along said first portion of the side wall and along a portion of the base end wall delimiting the air outlet duct, wherein the cover half shell comprises a peripheral edge extending along a perimeter of the cover end wall and along said second portion of the side wall, the peripheral edge of the base half shell and the peripheral edge of the cover half shell being joined to each other.

3. The housing of claim 1, wherein the chamber side panel and the seat in which the chamber side panel is fitted have an angular span, with respect to a central axis of the impeller chamber, smaller than 180°, said chamber side panel and seat extending from an end area of the first portion of the side wall at a junction between the impeller chamber and the radially inner side of the air outlet duct.

4. The housing of claim 1, wherein the chamber side panel comprises lateral ends coupled to respective lateral ends of the seat in which the chamber side panel is fitted through ribs fitted into respective guide grooves, and wherein the chamber side panel further comprises terminal ends coupled to the base end wall and to the cover end wall, respectively, through alignment pins fitted into respective holes.

5. The housing of claim 1, wherein the chamber side panel comprises rearwardly at least one ledge protrusion extending within the seat of the chamber side panel up to the first portion of the side wall.

6. The housing of claim 1, wherein said at least one resonant cavity is at least partially filled with a sound adsorbing porous material.

7. A housing of plastics material for a centrifugal blower for automotive HVAC systems, comprising a base end wall, a cover end wall and a side wall extending between the base end wall and the cover end wall, in said housing there being defined an impeller chamber and an air outlet duct, wherein on the cover end wall there is formed an air inlet opening facing the impeller chamber, and on the side wall there is formed an air outlet opening facing the air outlet duct, wherein a sound absorption structure is arranged on said side wall, said sound absorption structure comprising at least one resonant cavity fluidically connected to the impeller chamber and the air outlet duct through a plurality of slits arranged on the side wall and facing at least one of said impeller chamber and air outlet duct, the housing further comprising a base half shell formed by the base end wall and by a first portion of the side wall, protruding from the base end wall, said first portion of the side wall surrounding the impeller chamber and delimiting on a radially outer side the air outlet duct, a cover half shell formed by the cover end wall and by a second portion of the side wall, protruding from the cover end wall, said second portion of the side wall delimiting on a radially inner side the air outlet duct, and at least one of:

a chamber side panel fitted in a seat formed in the base half shell and facing said impeller chamber, wherein said at least one resonant cavity is formed between the chamber side panel and said first portion of the side wall, and wherein said slits are formed on the chamber side panel, and an outlet side panel fitted in a seat formed in the cover half shell and facing said air outlet duct, wherein said at least one resonant cavity is formed between the outlet side panel and said second portion of the side wall, and wherein said slits are formed on the outlet side panel, wherein the base half shell and the cover half shell are joined to each other, and wherein the seat in which the outlet side panel is fitted is formed as a recess in the second portion of the side wall, facing the air outlet duct, and wherein the outlet side panel comprises a surface facing the air outlet duct that is flush with a surface, facing the air outlet duct, of an area of the second portion of the side wall adjacent to the seat.

8. The housing of claim 7, wherein the outlet side panel and the seat in which the outlet side panel is fitted have a longitudinal span smaller than a length of the air outlet duct, said outlet side panel and seat extending from an end area of the second portion of the side wall adjacent to a junction between the impeller chamber and the radially inner side of the air outlet duct.

9. The housing of claim 7, wherein the outlet side panel comprises lateral ends coupled to respective lateral ends of the seat in which the outlet side panel is fitted through ribs fitted into respective guide grooves, and wherein the outlet side panel comprises terminal ends coupled to the cover end wall and to the base end wall, respectively, through alignment pins fitted into respective holes.

10. The housing of claim 7, wherein the outlet side panel comprises rearwardly at least one ledge projection extending within the seat of the outlet side panel up to the second portion of the side wall.

11. The housing of claim 7, wherein said at least one resonant cavity is at least partially filled with a sound adsorbing porous material.

* * * * *